Nov. 9, 1971    L. A. BRIESE    3,618,432
VIBRATION-FREE LATHE
Filed March 17, 1969    4 Sheets-Sheet 3
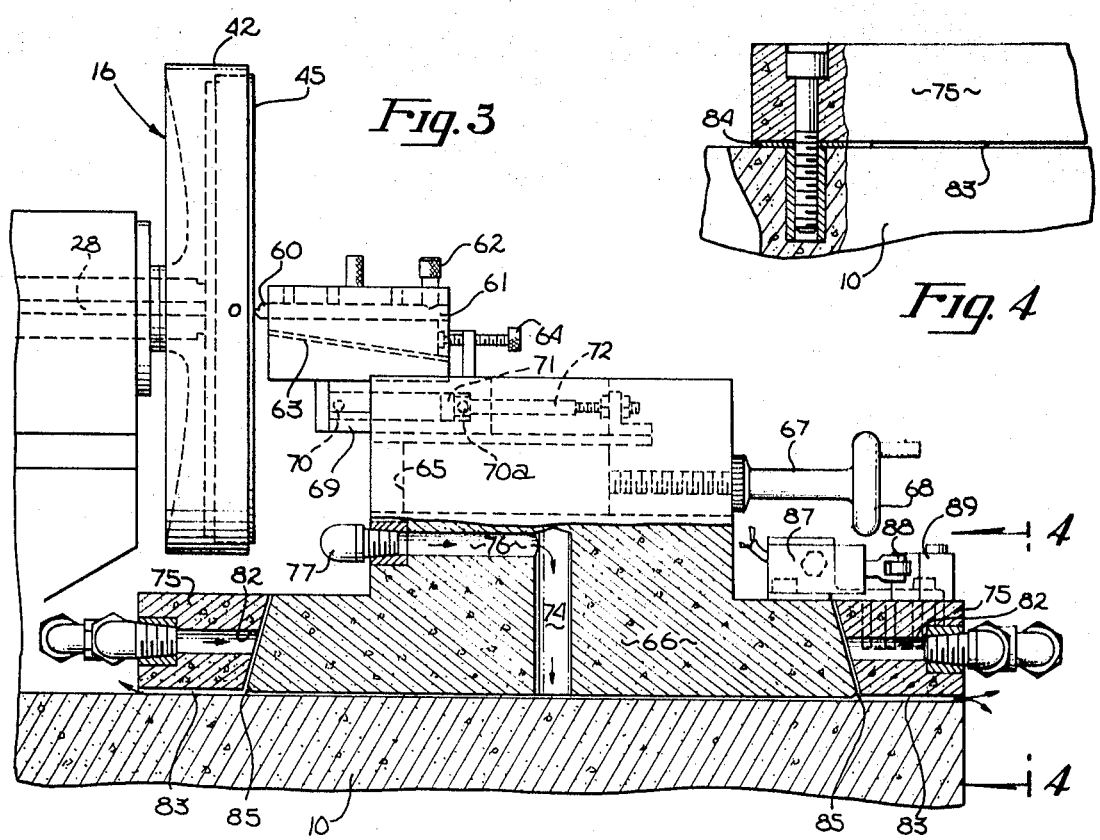
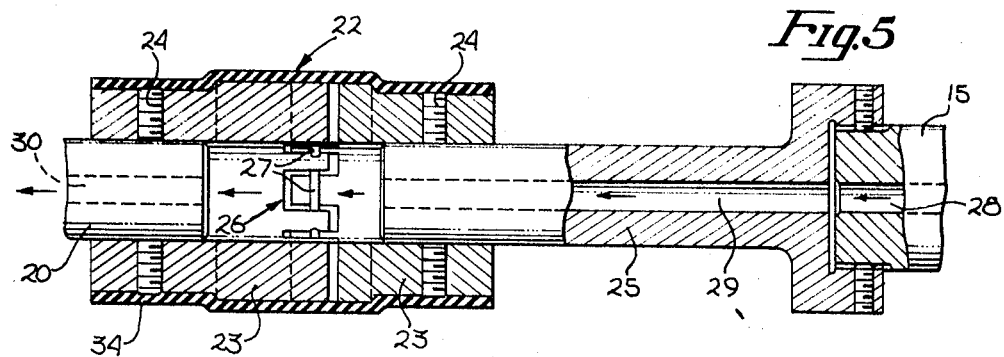
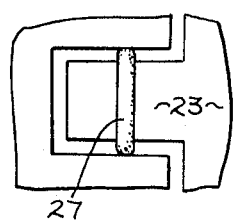
INVENTOR
LEONARD A. BRIESE
BY
Forrest J. Lilly
ATTORNEY Nov. 9, 1971  L. A. BRIESE  3,618,432
VIBRATION-FREE LATHE Filed March 17, 1969  4 Sheets-Sheet 4

INVENTOR
LEONARD A. BRIESE
BY
Forrest J. Lilly
ATTORNEY

United States Patent Office 3,618,432
Patented Nov. 9, 1971

3,618,432
VIBRATION-FREE LATHE
Leonard A. Briese, Los Angeles, Calif., assignor to Wescal Industries, Inc., El Segundo, Calif.
Filed Mar. 17, 1969, Ser. No. 807,602
Int. Cl. B23b *3/00, 13/00*
U.S. Cl. 82—2
12 Claims

ABSTRACT OF THE DISCLOSURE

A novel lathe construction enables a smooth, mirror-like surface to be machined by the lathe. The design is especially suited to products requiring an extremely smooth surface, for example memory discs for computers.

BACKGROUND OF THE INVENTION

The present invention relates generally to machine tools and particularly to lathes, although in its broad aspects, the invention is not limited to lathes.

There is an increasing demand in modern industry for high precision in manufacturing articles made by turning a work piece on a lathe or similar tool. For example, there exists a requirement for a super-smooth surface on the face of a disc which is subsequently coated with iron oxide particles to provide a magnetic storage unit or memory unit for a computer. If the very smooth surface on the face of the disc can be produced when the final cut is made on the lathe, the surface then remains true and can be subsequently coated without any further operations, such as polishing, buffing and the like to obtain a higher degree of smoothness.

A surface smooth within the range of a few microinches is not possible with known tools because of the vibration transmitted through the structural elements of the machine. Transmission of vibration affects both the cutting tool and the work piece and the result is small surface ripples in the finished product. While this surface is smooth enough for many purposes, yet it is not an accurate, planar surface within the range of a few microinches as is required for certain purposes. The vibration of the tool can come from a number of sources, such as the prime mover, the drive elements transmitting power to the rotating work, friction encountered in the movement of lathe parts, and sources which may produce a non-uniform travel of the tool and the work piece.

A non-uniform rate of movement of the work past the cutting tool is also a possible source of roughness in the final as it results in a change in the load on the tool and may pass through a resonance point at which ripples appear on the finished surface. This can be eliminated as a source of trouble by keeping constant the linear speed of the work piece past the tool.

Hence it becomes a general object of the present invention to provide a novel construction for a machine tool that eliminates vibration originating within the tool so that such vibration does not reach the tool or the work.

Another object of the invention is to provide a novel construction for a lathe that substantially eliminates friction between certain of the parts and thus provides a uniform, vibration-free movement of the cutting tool across the face of the work piece.

Another object of the invention is to provide a machine tool, more particularly a lathe, capable of producing a super-smooth surface on a work piece as a result of turning operations that are maintained constant in their essential characteristics.

SUMMARY OF THE INVENTION

The above and other objects of the invention are attained by providing a base on which workholding means and toolholding means are mounted. The base includes a body of a material having substantially the vibration absorbing or attenuating characteristics of granite. Granite is a preferred material for this purpose but any other mineral or material having similar physical characteristics may be used.

The base is preferably a monolithic block of granite. The workholder is mounted on a granite mounting block which is supported on the base, and also the cutting tool is mounted on a granite slide supported movably on the base. Vibration generated anywhere within the lathe is attenuated by passage through the granite base and said blocks and consequently does not reach the tool or the work piece in sufficient intensity to impair the true cutting accuracy of the cutting tool or the accurate movement of the work piece while it is being rotated.

Granite has several advantageous characteristics for this purpose. It is a hard, dimensionally stable material having a comparatively high compressive strength. It can be cut, ground and polished to obtain smooth surfaces and does not absorb water. Granite has a very low coefficient of thermal expansion, and this is an advantage in manufacture is well as in the final lathe as it permits holding dimensions to close tolerances. Most importantly, it attenuates or absorbs vibration. The reason for this is not known for a certainty but may be a result of a combination of various characteristics. Granite as a material has a low degree of elasticity and a high degree of internal friction. It is also a non-homogeneous substance since it has quartz crystals embedded in a matrix of feldspar, and it is believed that there is energy loss in the vibrations by reflection at the interfaces between the quartz and the matrix.

Means are provided for establishing and maintaining a gas film between the slide on which the cutting tool is mounted and the base supporting the slide in order to reduce friction between the base and slide. Means are also provided for establishing and maintaining a gas film at both sides of the slide between it and each of the guiding ways. These air films are maintained at a relatively low pressure but sufficient to maintain a film of a thickness that substantially eliminates friction between the slide and any of the parts which support or guide it. The forces produced by the several air films balance one another and inherently tend to maintain the balance, restoring the slide to the proper position if there is any deviation therefrom. Consequently, the slide moves with a uniform, vibration-free movement as the cutting tool traverses the face of the work piece.

The invention also includes a novel design of a vacuum chuck or holder for the work and an insert of granite or equivalent material behind the work to attenuate vibration.

Freedom from vibration is promoted by means for regulating the linear rate of tool feed across the work surface in relation to spindle speed of rotation. This involves means for regulating the rate of spindle and work rotation and the rate of tool advance relative to the work in relation to the travel of the slide and tool from its starting position with the result that an essentially uniform chip loading on the cutting tool is maintained.

BRIEF DESCRIPTION OF THE DRAWING

The present invention will be better understood by reference to the following description and to the annexed drawing, in which:

FIG. 3 is an enlarged fragmentary section and elevation taken on line 3—3 of FIG. 2.

FIG. 4 is a further enlarged elevation, with parts broken away, taken on line 4—4 of FIG. 3, showing inserts for machine screws fastening together non-metallic members.

FIG. 5 is an enlarged fragmentary median section taken on line 5—5 of FIG. 2 showing connection of the motor drive shaft to the spindle.

FIG. 5a is a further enlarged fragmentary elevation of a part of the drive coupling.

DESCRIPTION OF A PREFERRED EMBODIMENT

Figure 1:
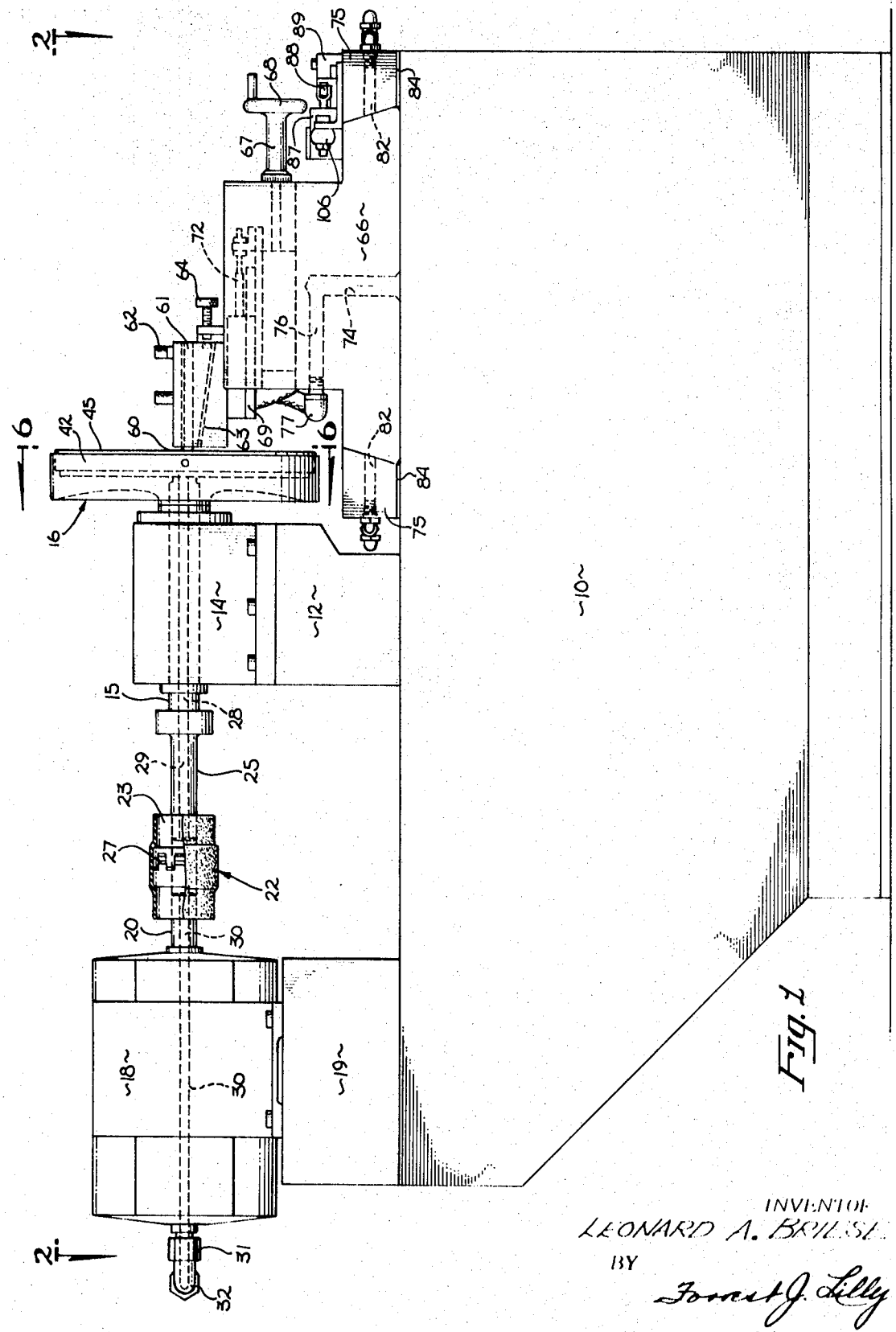
FIG. 1 is a side elevation of a lathe embodying the present invention.

Referring now to the drawing, and more particularly to FIG. 1, the lathe shown therein as embodying the present invention comprises a base 10 which is preferably a single monolithic block of granite. Although the invention is not necessarily limited to granite for this member, it is a preferred material for reasons explained above. Other naturally occurring minerals or rock may be equally satisfactory as may also selected synthetic materials.

On top of base 10 is bearing mounting block 12, which is a portion of the means for mounting on base 10 a spindle bearing 14 and spindle 15. Bearing 14 is preferably of the hydrostatic type in which the spindle turns on an oil film. The bearing is a means for rotatively mounting spindle 15 to one end of which is attached the vacuum chuck 16 which is a holder for the work piece. Spindle 15 projects beyond bearing 14 for connection at its other end to electric motor 18 which provides a power source for rotating the spindle and the work piece. It is preferred that motor 18 be axially aligned with and directly connected to spindle 15 since this latter arrangement has been found to be most favorable from the standpoint of eliminating vibration at the work. Motor 18 is mounted on block 19 which in turn rests upon the base 10. Motor 18 is preferably a variable speed, direct current motor for reasons that will become apparent. Blocks 12 and 19 are both preferably made of the same material as base 10 for the same reasons that indicate the choice of granite as the preferred material for the main base or foundation for the lathe.

The drive connection between output shaft 20 of motor 18 and spindle 15 is shown in greater detail in FIG. 5. It includes flexible coupling 22. Although other designs of flexible couplings are available and can be used instead, the coupling shown here comprises two similar half-sections 23, which are respectively connected by set screws 24 or the like to motor output shaft 20 and to spindle extension 25 on the end of spindle 15. The two sections of the couplings have intermeshing fingers as indicated at 26 which allow for some angular deflection between the axes rotation of the two coupling sections and thereby eliminate any vibration in the lathe that might be caused by minor misalignment between the axis of motor shaft 20 and the axis of spindle 15.

The fingers 26 of one half or section 23 of the coupling are each peripherally grooved to receive an O-ring 27, preferably of a low-friction material such as the fluorinated hydrocarbons known as "Teflon." The metal surfaces of the two coupling sections are spaced apart. The radial side faces of the fingers are spaced by the interposed O-ring 27 but transmit torque through the O-ring, which damps and absorbs any vibration. The coupling sections are spaced apart endwise or axially as shown in FIGS. 5 and 5a. This clearance allows for some movement of the rotor of motor 18 toward and away from the spindle, as often occurs, and prevents axial transmission of vibration from the motor to spindle 15 through a metal-to-metal contact, since the coupling does not transmit axial movement.

Coupling 22 is connected to spindle extension 25 rather than directly to spindle 15. In order to provide means for connecting a vacuum line to the work holder, as will be described, spindle 15 has an axially extending concentric bore 28 which opens at one end to a similarly located bore 29 in extension 25. Bore 29 communicates with the interior of coupling 22.

Motor shaft 20 has a central axially extending bore 30 that also opens to the interior coupling 22 and extends the full length of the motor shaft to receive at the other end a swivel or rotary coupling 31 of any suitable known design. The coupling 31 connects axial passages 28, 29, 30 to vacuum line 32, shown in FIG. 2, leading to a vacuum pump and tank indicated diagrammatically at 33. An elastic sleeve 34 of rubber or similar material surrounds coupling 22 in order to close all openings therein and prevent leakage of air at this location into the interior of the coupling and hence into the vacuum line and system.

Figure 6:
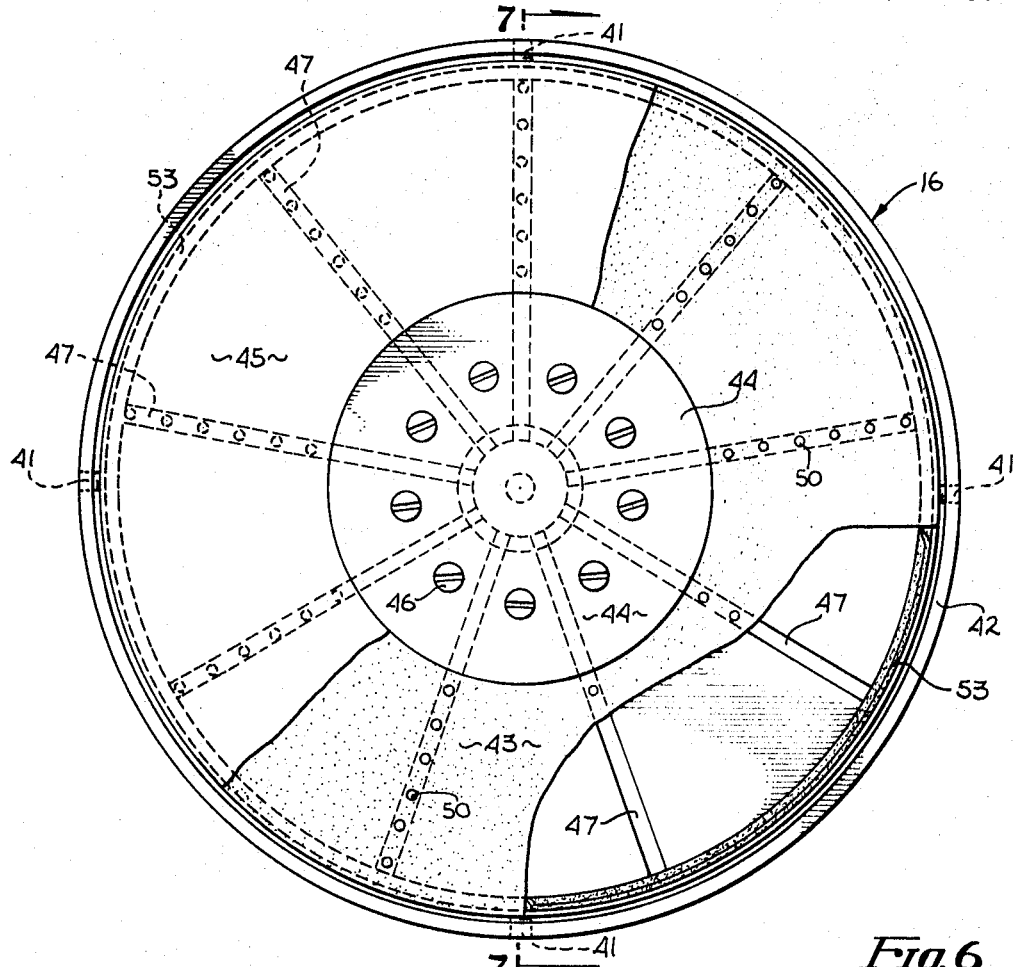
FIG. 6 is a front elevation of the vacuum chuck with portions of the workholding disc broken away to show the vacuum passages.

On the other end of spindle 15, that is, the end removed from coupling 22, is mounted workholder 16. This element is shown in detail in FIGS. 6 and 7 from which it will be seen that it resembles a face plate in shape and it functions in the manner of a vacuum chuck to hold the work piece.

Figure 7:
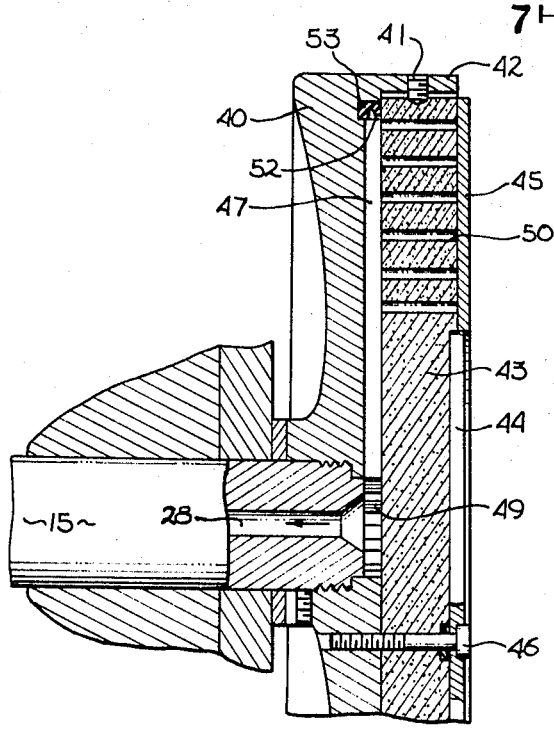
FIG. 7 is a fragmentary median section through the work holder of FIG. 6 on line 7—7.

The workholder comprises a metal back plate 40 provided on its rear side with a central hub having an internally threaded bore for attachment of the workholder to spindle 15, as shown in FIG. 7. Plate 40 is contoured on its back side, as indicated in FIG. 7, in order to provide stiffness and an absence of resonance points in the plate. Around the periphery of the plate is annular flange 42. The plate is preferably made of metal, aluminum being a preferred metal for this purpose.

Annular flange 42 provides a recess on one face of plate 40 which is adapted to receive a granite insert in the form of disc 43. Set screws 41 or the like in flange 42 transmit torque to disc 43 as well as hold the granite disc in place on plate 40. Disc 43 is substantially uniform in thickness, but has a centrally located recess on the front side adapted to receive metal disc 44 with a snug fit. Plate 44 is circular and is centered with respect to the axis of revolution of the workholder to center on the workholder each work piece, such work piece being an annular memory disc 45. A plurality of machine screws 46 pass through discs 43 and 44 to hold them on plate 40.

Plate 40 is provided with a plurality of radially extending passages 47, all of which communicate at their inner ends with a central opening 49 which in turn is in communication with air duct 28 in spindle 15. In registration with each radial passage 47, there is located in disc 43 a series of axially extending branch air passages 50 that pass through the disc and open to the exposed or front face of disc 43. From this structure it will be apparent that when air is withdrawn from the series of passages 50, 47, and 49 by vacuum pump 37, a work piece, such as annular memory disc 45, is held firmly in place on the front face of the workholder by external air pressure. No other means is required for fastening a work piece to the workholder since the work piece is centered by engagement with fixed disc 44.

Radial passages 47 terminate at their outer ends at annular recess 52 in the face of plate 40. In the recess is sealing ring 53 which has a deformable lip that engages the rear face of disc 43 with an air-tight seal to prevent leakage of air into passages 47.

The granite disc 43 serves to insulate the work piece from any vibrations transmitted from other portions of the lathe to chuck plate 40, thereby minimizing any lateral movement of the work piece which would operate adversely to the production of a perfectly smooth finish on the outer face of the work piece.

The cutting tool in contact with the work piece is a diamond embedded in the end of mounting shank 60. The shank carrying the diamond is clamped in tool holder 61 by screw 62 that removably secures the shank in place. The tool holder is provided with a tapered block on and above ramp 63 along which the tool can be positioned by thumb screw 64. In this way the elevation of the diamond cutting tool can be closely regulated to bring it precisely into a plane passing through the center of revolution of workholder 16.

Figure 2:
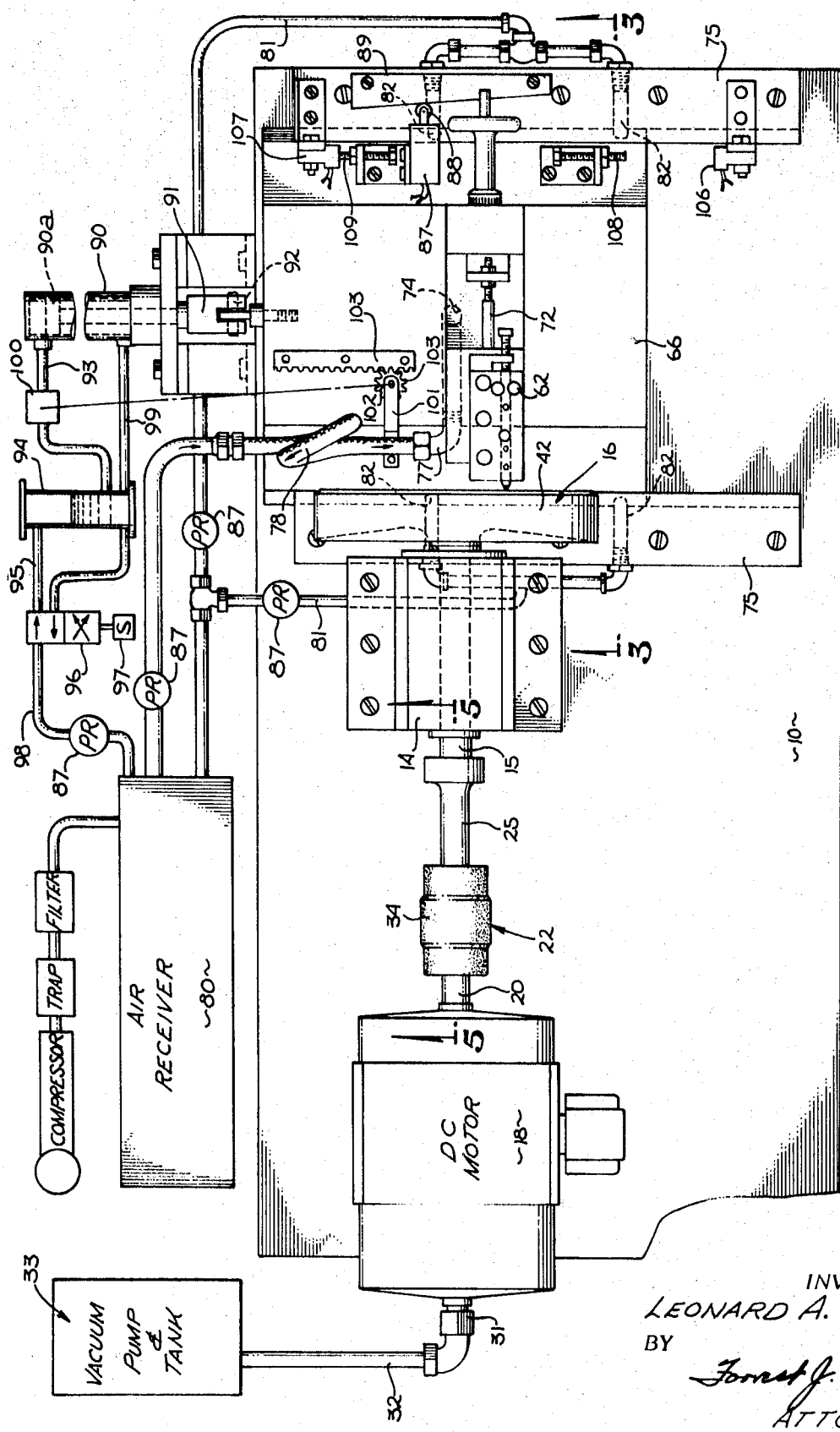
FIG. 2 is a plan view of the lathe of FIG. 1 but also showing diagrammatically air and vacuum supply lines and equipment.

Tool holder 61 and its ramp are slidably mounted on top of tool slide 65, which in turn is mounted on the main cross slide 66. Movement of the tool slide and tool together on cross slide 66 toward work piece 45 to effect a cut of a given depth in the face of work piece 45 is limited by the position of the tool slide; and movement of the tool slide is controlled by lead screw 67 and hand wheel 68, as is well known in machine tools. Movement of the cutting tool and holder 61 toward and away from the work piece and relative to slide 65 is effected by fluid, typically compressed air, introduced into the cylinder 69 through port 70, the fluid under pressure causing the cylinder space to expand at one end and move the tool holder and tool toward the work. Piston 71 in cylinder 69 is stationary to limit forward travel of the tool by engagement with the end of cylinder 69. The tool is retracted by introducing fluid under pressure to the opposite end of the cylinder through port 70a. The position of piston 71 on tool slide 65 and hence the limit of the advance of the cutting tool, relative to the tool slide, is regulated by changing the point of connection of the piston rod 72 to the tool slide. The outer end of piston rod 72 is threaded, as shown in FIG. 2, and a pair of nuts on the threaded end of the piston rod enable a change to be made in the connection of the piston rod to stationary bracket 73 on the cross slide and hence in the location of piston 71 when it bottoms in cylinder 69.

Cross slide 66 is likewise a block of granite or the like which is supported on the upper surface of granite base 10. Movement of cross slide 66 is directed by a pair of spaced rails or ways 75 which are parallel to each other and located one on each of two opposite sides of slide 66, as shown in FIG. 3.

The two opposite side faces of slide 66 are planar faces that converge upwardly; and the opposed surfaces on rails 75 are similarly oriented planar surfaces. This structure provides a dovetail arrangement which allows the slide to move horizontally in a straight line across the upper surface of base 10 while ways 75 restrain the slide against lateral or transverse movement and also against upward movement away from the base.

In order to eliminate or at least minimize friction between slide 66 and base 10 beneath it, and thereby achieve a steady uniform rate of movement of the slide and the tool with respect to the work piece, the slide is supported on a thin air film maintained between it and the upper surface of base 10. For this purpose air under pressure is supplied beneath the slide through a single centrally located inlet port 74 which is connected through a laterally extending passage 76 to fitting 77 on the end of flexible hose 78. Hose 78 is part of the air supply line connected to receiver 80. Air under suitable pressure is supplied to the receiver by a compressor and other means, not all shown on the drawing, such means including a condenser, water trap, pressure reducers, filters, and the like as are usual and well known elements in an air supply system of this type. The air is generally compressed to a suitably high pressure and then allowed to expand to a selected lower operating pressure after leaving receiver 80. For this a pressure regulator 87 is placed in each of the supply lines to reduce pressure as desired.

Although air is spoken of herein as the fluid constituting the film between the slide 66 and the base or the side rails, it will be realized that any other dry gaseous fluid can be employed equally well. Air is preferred because of its ready availability and low cost, permitting it to be wasted.

The air film under slide 66 is typically about .001 inch thick, although a film of lesser thickness may be employed if desired. The film is ideally of uniform thickness in order to provide a uniform rate of pressure drop outwardly away from the centrally located supply port 74. This requires that the opposing surfaces on the underside of slide 66 and the top of base 10 to be very smooth, planar surfaces. By placing supply port 74 midway between the ends and also midway between the two parallel sides of the slide, the slide is supported evenly in all directions around the supply port since the rate of pressure drop is substantially uniform toward opposite points on the perimeter of the main slide.

Friction between the slide and ways 75 is substantially eliminated by maintaining an air film between the slide and each of the ways at opposite sides of the slide. For this purpose air is supplied from accumulator 80 through pipes 81 to air passages 82 in each of ways 75. Because of the range of travel of the slide with respect to the stationary ways, it will be noted from FIG. 2 that two supply ports 82 are provided in each of the ways; and in the event of a longer range of travel it might be desirable to provide more air inlet openings. Ports 82 open to the interface between the way and the slide at the midpoint of the vertical width of the interface. This provides for uniform pressure drop in the air film both above and below the point of air inlet and achieves lateral balancing of the two air films. Here again, the opposing faces on the slide and the ways are brought to a very smooth, highly polished finish and a precisely planar condition in order to maintain the air film as uniform in thickness as is possible.

Obviously, fluid pressure in the air film beneath the slide decrease progressively away from central inlet 74; but the air pressure at the edge of the slide is still above atmospheric. Each of ways 75 is spaced above the top surface of base 10, as shown at 83 in FIGS. 3 and 4 by spacers 84 at each bolt fastening the rail in place. This space between each way and the base beneath it is preferably at least .010–.015 in. wide, but may be more. The corner of the slide at the acute angle opposite the inner end of this space 83 is broken or beveled as indicated at 85 in FIG. 3 in order to form a longitudinally extending passage at the lower corner of the slide which receives air discharged from the adjoining edge of the gas film below the slide and at the side of the slide. This space 85 is large enough that it acts as a collection gallery at the edges of the air films and tends to equalize pressure at the edges. Space 85 eliminates turbulence or back pressure that would cause a variable and unpredictable rate of pressure drop in the air films that would tend to destroy the balance of forces obtained.

The space 83 between each way 75 and the top surface of the base 10 provides a passage through which air from the air films contacting the slide escape to the atmosphere along the full length of each rail 75. The space 83 is made wide enough to offer little restriction on air flow through it. Thus each space 83 provides an escape or discharge passage along one edge of the film beneath the slide as well as at one edge of the film at a rail 75.

The effect of these air films is not only to eliminate the friction between the slide and its guiding surface as it moves to traverse the tool across the work piece but also to confine and direct the slide to a straight line during this movement. The air pressure in the films between the slide and the ways has a downward component opposing the lift of the air film beneath the slide. Because of the greater area of the latter film the maximum pressure in it is comparatively less to avoid undue upward movement of the slide. For example, air pressure from accumulator 80 is reduced at regulator 87 to about 5 p.s.i. at inlet port 74 while pressure at the sides of the slide may be about 15 p.s.i.

It will be appreciated that as long as the air film beneath the slide is of uniform thickness and the air film at each side of the slide is of the same thickness as at the opposite side, vertical and horizontal forces on the slide are balanced and the slide continues to move along a rectilinear path. Should the air film at any location become thicker, the air flows through that portion more freely with a resultant drop in pressure. This produces a lesser force acting upon the slide at that position; and at an opposite position on the slide a counterbalancing restoring force is created. As a consequence, the action of these air films is to automatically compensate for any change in pressure exerted on the slide by an air film and to maintain the slide always in a true path, as determined by the solid surfaces of the ways 75 and the base 10.

One end of the cylinder is filled with hydraulic fluid and is connected by conduit 93 to the liquid-containing portion of reservoir 94. The reservoir also contains a body of air connected by air line 95 to 4-way valve 96 operated by solenoid 97. The valve is connected by line 98 to a source of air under pressure, referred to above as supplying air to receiver 80 but not shown in detail in the drawing. Valve 96 is also connected by line 99 to cylinder 90 at the other side of the piston therein from the connection of liquid line 93, the cylinder space at said other side being filled with air. Movement of the piston rod is achieved by introducing air under pressure through valve 96 and line 95 into one end of reservoir 94. Hydraulic fluid is then forced through supply line 93 into one end of cylinder 90, causing piston 90a to move (down in FIG. 2) toward the slide. Slide 66 then advances, carrying the cutting tool across the work piece.

It has been found desirable to maintain the linear speed of the work past the cutting tool at a comparatively constant value, or at least to maintain it within a narrow range of speeds. This is done in order to remove metal from the work piece at such a rate that no vibration is set up within the workpiece by the action of the cutting tool. In other words, the cutting operation takes place under optimum conditions. To enable this to be done, means are provided for maintaining the linear speed of the work piece, measured in distance per unit time, typically surface feet per minute, at a comparatively constant value. Without such means, the linear speed of the work piece with respect to the cutting tool increases in direct relation to the distance of the cutting tool from the center of revolution of the work piece. The means for varying the speed of rotation of the spindle 15 and the work piece carried thereby in order to achieve this desired result includes a potentiometer 87 controlling the power supplied to motor 18. The resistance of the potentiometer is regulated by linear movement of a control element 88 which rides against cam 89. The potentiometer is mounted on slide 66 to move therewith and cam 89 is affixed to a rail 75, the cam surface being inclined to the direction of movement of the potentiometer. Consequently, as slide 66 moves between ways 75, control element 88 moves in and out of the potentiometer. More particularly, as the slide moves downwardly in FIG. 2 in a direction to advance the cutting tool across the face of the work piece, control element 88 moves outwardly against the surface of cam 89 to reduce the motor and spindle speed at a rate such as to maintain substantially constant the linear speed of the work piece at the point of contact with the cutting tool.

Movement of the cross slide 66 carrying the cutting tool across the face of the work piece is produced by the action of cylinder 90 which is preferably part of an air-hydraulic system shown only diagrammatically in FIG. 2, as such systems are well known. The cylinder has within it a piston 90a movable lengthwise of the cylinder and connected to piston rod 91 which extends outside the cylinder and is pin-connected at 92 to slide 66. One end of cylinder 90 is supplied with hydraulic fluid and is connected by conduit 93 to the liquid-containing portion of the air-hydraulic reservoir 94. The reservoir also contains a body of air connected by line 95 to 4-way valve 96 which is shifted between alternate positions by solenoid 97. Valve 96 is connected by line 99 to a source of air under pressure, referred to above as supplying air to receiver 80 but not shown in detail in the drawing. Valve 96 is also connected by conduit 99 to cylinder 90 at the side of piston 90a away from the connection of liquid line 93. The cylinder space at said other side is supplied with air; and in one position of valve 96 air under pressure is supplied to the cylinder by line 99, while in the alternate position shown in FIG. 2, line 99 exhausts air from cylinder 90 to the atmosphere.

The rate of fluid flow through line 93 is controlled by flow regulating valve 100, typically a needle valve or the like having an orifice of which the area can be regulated by rotational movement of a valve stem. Valve 100 is mounted in a fixed position on the lathe, as by bracket 101 attached to one of the rails 75. On the valve stem is mounted pinion 102 which meshes with and is rotated by rack 103 mounted on top of slide 66. Accordingly, the rectilinear movement of the slide produces a proportional amount of rotational movement of pinion 102 that changes the size of the fluid-passing orifice in valve 100 to thereby regulate the rate of flow into cylinder 90.

If the angular velocity of the work piece is maintained constant and the tool traverses the work at a constant rate, the chip loading on the cutting tool is constant. If the angular velocity of the work piece is progressively reduced as described above, while the feed rate of the cutting tool across the work piece is held constant, the chip loading on the cutting tool increases progressively from beginning to end of the surfacing operation since the radial travel of the cutting tool per revolution of the work piece now increases throughout the operation. Since it is desired to have a constant chip loading, in order to improve the smoothness of the final cut and to avoid producing any vibration in the work piece as a result of taking too heavy a cut, means are also provided to reduce the feed rate of the tool as slide 66 moves the tool across the work piece. This means for controlling the rate of feed of the tool and also the rate of advance of slide 66, as a function of the spindle speed includes the flow control valve 100 and the rack and pinion arrangement 102–103 for adjusting the flow restriction imposed by the valve in accord with advancing movement of slide 66.

Movement of piston rod 91 to advance slide 66 and carry the cutting tool across the face of the work piece is achieved by introducing air under pressure into the air-hydraulic reservoir 94 by placing valve 96 in the condition indicated in FIG. 2. The air pressure forces hydraulic fluid through line 93 into cylinder 90 at a rate controlled by regulating valve 100. As the slide advances, rack 103 carried by the slide rotates pinion 102 in a direction to impose a greater restriction on fluid flow at valve 100, thus gradually slowing the rate of advance of the cutting tool with respect to the work piece. Thus the rate of slide movement is a function of slide travel from the initial position; and this rate is also related to the rotational speed of spindle 15 and work piece 45, because of the action of potentiometer 87. The result is that the chip loading on the cutting tool is maintained substantially constant throughout its engagement with the work.

At the end of the advance movement of the slide, solenoid 97 shifts valve 96 to the alternate position, thereby introducing air under pressure from line 98 through line 99 into the cylinder, causing the slide 66 to be retracted and hydraulic fluid in cylinder 90 to be returned to reservoir 94.

The lathe may be operated by manual controls or it may be provided with suitable automatic control circuit which, when once energized manually, controls the full cycle of operations required to face a single work piece 45 and return the main slide to an initial or starting position. Any one of various electric or air control systems may be employed. For this purpose, there typically may be mounted on top of the lathe a pair of limit switches 106 and 107 included in an electric system. These two switches are mounted in the path of adjustable stops 108 and 109 carried by the slide and which respectively actuate switches 106 and 107, upon contact therewith. Switch 107 when engaged by stop 109, as shown in FIG. 2, is adapted to condition a control circuit to initiate and control the several operations in a cycle of the machine. One function of the control circuit is to start motor 18 so that the work piece on work holder 16 is rotating prior to engagement with it by the cutting tool. This cycle also includes supplying fluid to cylinder 69 to advance the cutting tool from a retracted position to the advanced position shown in FIG. 2 in which the cutting tool is in contact with the work piece. Also, valve 96 is placed in the condition shown in FIG. 2 to admit air under pressure to reservoir 94, thus causing slide 66 to advance and move the cutting tool across the work piece. Upon finishing the traverse across the work piece, stop 108 comes into contact with limit switch 106 which causes the control circuit to retract the cutting tool from its advanced position by the admission of operating fluid through port 70a to cylinder 69, after which valve 96 is shifted to the alternate position causing slide 66 to be returned to its initial or starting position.

From the foregoing description it will be apparent without detailed discussion thereof that various modifications in the detailed construction and arrangement of the elements constituting the present invention may occur to persons skilled in the art but without departing from the spirit and scope of the present invention. Accordingly, it is to be understood that all such modifications are considered as being within the scope of the invention disclosed herein.

I claim.

1. A lathe comprising:
   a base;
   work holding means rotatably mounted on the base and adapted to hold a work piece;
   and tool holding means mounted on the base at a position spaced from the work holding means and including means for moving a tool into engagement with a work piece on said work holding means;
   said base including a body of a material having substantially the vibration attenuating characteristics of granite;
   said tool moving means including a cross slide embodying a body of material also having substantially the vibration attenuating characteristics of granite.

2. A lathe as in claim 1 that also includes means for establishing and maintaining a gas film between the base and the slide to reduce friction therebetween.

3. A lathe as in claim 2 that also includes spaced parallel ways at the sides of the slide guiding the slide and means for establishing and maintaining a gas film between the slide and each of the ways.

4. A lathe as in claim 3 in which the ways are mounted on the base but spaced therefrom by a distance of at least the order of .010 inch to form a passage for escape of gas from the gas films in contact with the slide.

5. A lathe as in claim 3 in which the means for establishing and maintaining the air films include gas supply ports disposed centrally of the surfaces between which gas films are to be maintained whereby pressure drop around the supply ports is balanced.

6. A lathe as in claim 3 which also includes means for supplying gas at a higher pressure to the films between the ways and the slide than to the film under the slide.

7. A lathe as in claim 6 in which the sides of the slide are planar surfaces upwardly converging.

8. A lathe as in claim 1 in which said slide is movable along a fixed rectilinear path relative to the base and to the work holding means; and including also:
   drive means for rotatably driving the work holding means;
   drive means moving the slide along said rectilinear path to cause the cutting tool to traverse the work piece; and
   means progressively changing the rate of drive of at least one of said drive means in response to travel of the slide.

9. A lathe as in claim 1 in which said slide is movable along a fixed rectilinear path relative to the base and to the work holding means; and including also:
   drive means for rotatably driving the work holding means;
   means regulating the rotational speed of said drive means in response to travel of the slide;
   drive means moving the slide along said rectilinear path to cause the cutting tool to traverse the work piece; and
   means regulating the rate of movement of said slide in response to slide travel.

10. A lathe as in claim 9 in which
    the actuating means is a piston and cylinder receiving hydraulic fluid to move the piston;
    and the last-mentioned regulating means is a flow regulating valve regulating the rate of flow of hydraulic fluid into the cylinder.

11. A lathe comprising:
    a base embodying a body of a material having substantially the vibration attenuation characteristics of granite;
    work holding means embodying a plate mounted on said base and adapted to hold a work piece;
    bearing means mounted on said base for rotatably mounting said plate on and above the base;
    means including a granite disc mounted on said plate for spacing and vibration insulation of said work piece from said plate; and
    tool holding means mounted on the base at a position spaced from the work holding means and including means for moving a tool into engagement with a work piece on said work holding means.

12. A lathe as in claim 11 that also includes
    a plurality of interconnected passages in the plate and granite disc opening to a face of the granite disc at the area covered by a work piece; and
    a vacuum pump connected to said passages to generate a sub-atmospheric pressure in the passages to hold the work piece in place against the granite disc by external atmospheric pressure.

References Cited

UNITED STATES PATENTS

| | | | |
|---|---|---|---|
| 2,312,291 | 2/1943 | Tyson | 82—32 |
| 2,389,556 | 11/1945 | Siegerist | 82—27 X |
| 3,487,739 | 1/1970 | Murphy et al. | 83—915.5 X |

HARRISON L. HINSON, Primary Examiner

U.S. Cl. X.R.

82—32; 83—915.5